United States Patent [19]

Mumford

[11] 4,193,784

[45] Mar. 18, 1980

[54] METHOD OF LOADING CONTAINERS INTO AN ANNEALING LEHR

[75] Inventor: Eustace H. Mumford, Ottawa Lake, Mich.

[73] Assignee: Owens-Illinois, Inc., Toledo, Ohio

[21] Appl. No.: 952,749

[22] Filed: Oct. 19, 1978

[51] Int. Cl.² ................... C03B 9/14; C03B 27/00
[52] U.S. Cl. ........................................ 65/69; 65/117;
 65/118; 65/348; 198/425; 198/429
[58] Field of Search ................. 198/425, 459, 429;
 65/118, 117, 69, 348

[56] References Cited

U.S. PATENT DOCUMENTS

| | | | |
|---|---|---|---|
| 1,844,154 | 2/1932 | Good | 65/118 |
| 2,744,608 | 5/1956 | Ardell et al. | 198/425 X |
| 2,912,093 | 11/1959 | Lauck | 198/32 |
| 3,190,434 | 6/1965 | Dardaine | 198/425 |
| 3,667,622 | 6/1972 | Kamphues et al. | 198/425 X |
| 4,067,434 | 1/1978 | Mumford | 198/427 |

Primary Examiner—S. Leon Bashore
Assistant Examiner—F. W. Miga
Attorney, Agent, or Firm—D. T. Innis; Myron E. Click; David H. Wilson

[57] ABSTRACT

Glass containers received on a machine conveyor which passes a plurality of forming machine sections and receives the ware from the sections is coordinated in its relationship to the machine sweepouts, such that a gap is provided periodically in the row of ware carried by the machine conveyor. A bottle-transfer device which transfers the ware from the machine conveyor to a cross-conveyor is operated so that it also will maintain the gap that is provided in the line of ware. The ware on the cross-conveyor moves in line across the open-receiving end of the lehr and is pushed from the cross-conveyor onto the moving lehr mat. By providing a gap in the line of ware, the lehr loader pusher bar may be operated more slowly than in the past and to thereby provide a more stable transfer of ware from the cross-conveyor to the lehr.

4 Claims, 1 Drawing Figure

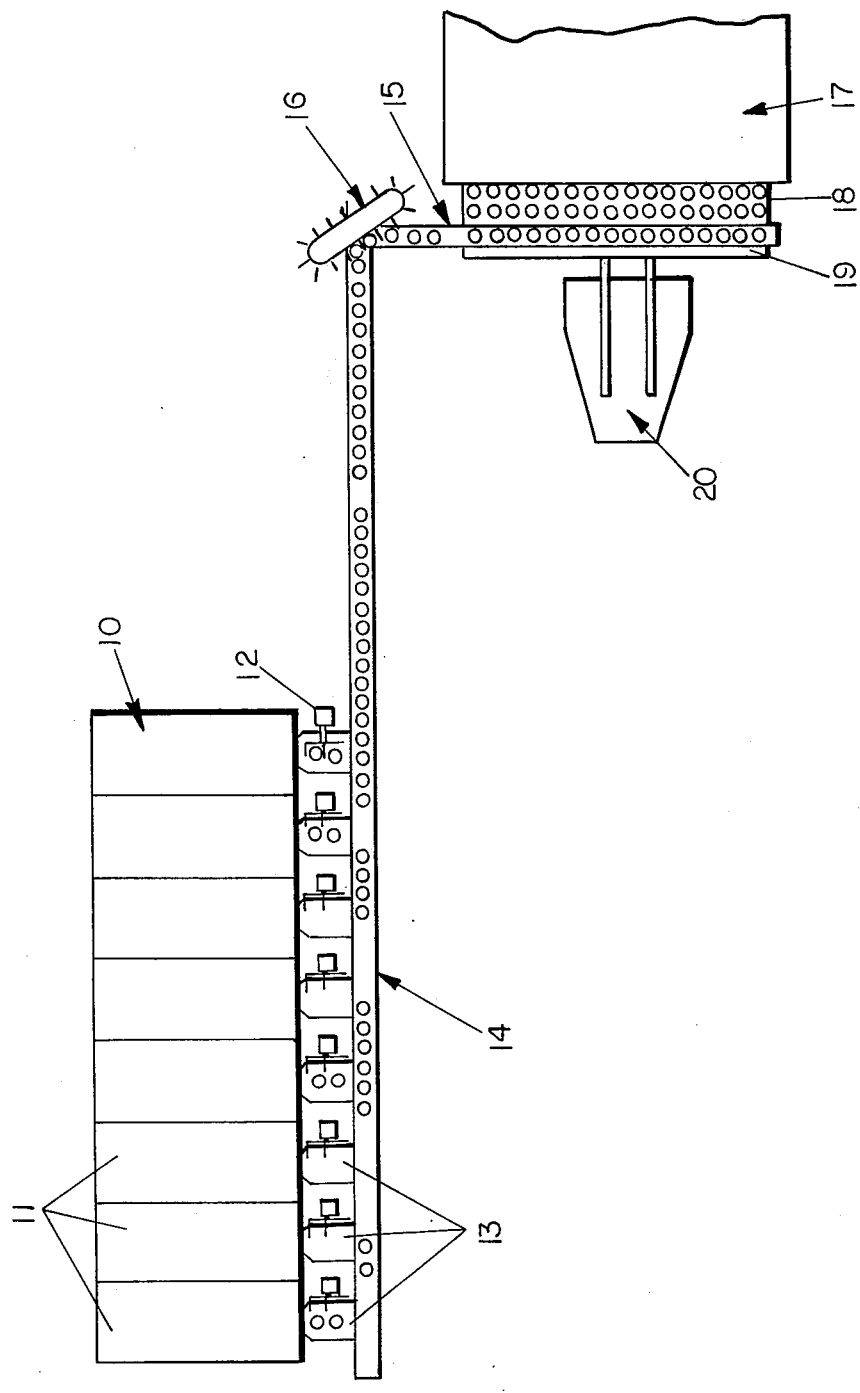

METHOD OF LOADING CONTAINERS INTO AN ANNEALING LEHR

BACKGROUND OF THE INVENTION

In the coordinated operation of moving newly formed ware from the forming machine to the annealing lehr, several considerations have to be met. Depending on the number of forming machine sections which are producing ware and the number and size of the ware or containers being produced, the pattern of the ware in the lehr may vary.

Generally speaking, it has been the practice to move newly formed ware from the forming machine sections, such as the IS machine sections, by the sliding of the ware from a dead plate onto a moving conveyor. This moving conveyor is common to all of the machine sections and is generally termed the "machine conveyor". Because the forming machines are becoming more productive due to the fact that single cavity machines have been replaced with plural cavity machines and additional sections are being added to what was considered to be the standard 6-section IS machine, so that a single machine can now produce as many as 320 bottles each minute. The number of containers to be handled and moved into a lehr has dramatically increased in the recent past. It is not uncommon to have eight individual sections in a forming machine producing three containers at a time from each section. Therefore, twenty-four bottles will be produced during one cycle of the machine. These machines may have a rate of twelve cycles per minute.

With the advent of even larger forming machines, such as a 10-section IS machine which, theoretically, could produce thirty containers during a complete machine cycle, it is readily apparent that movement of these containers from the forming machine to a lehr requires precise timing and increased speed to accomplish the task.

Another consideration is the fact that the containers, since they are moving while resting on their bottoms, may in some instances be somewhat unstable and therefore necessarily dictate that there be a limit to the amount of speed and acceleration or deceleration which may be experienced by the bottle or container during transfer to avoid tipping.

One other consideration, when all of the containers are equally spaced and are moving along the machine conveyor in what amounts to a continuous line of ware and the ware is then moved onto a conveyor that moves across the front of the lehr, referred to in the art as a "cross-conveyor", if there are an increasing number of containers being produced, the loading of the containers onto the lehr also has to be at a somewhat accelerated rate. Due to the close spacing of the containers on the cross-conveyor and the sliding movement of the ware from the cross-conveyor being accomplished by a pusher bar, there is the tendency for one end of the bar to tip over the leading one of the advancing containers during the time the pusher bar is moving through the line of ware. To avoid this obvious difficulty, the pusher bar, while moving through the line of ware to push the line of ware onto the lehr, has been provided with a component of movement in the direction of the cross-conveyor movement. This proved to be a fairly successful operation and gave to the bar a slight amount of extra time to clear the ware in advance of the leading container. However, with the ever increasing production rates of larger forming machines, this has, most recently, proved not to be the complete answer.

U.S. Pat. No. 4,067,434 issued Jan. 10, 1978 to E. H. Mumford, is a patent disclosing a lehr loader for pushing a row of glass containers from a cross-conveyor onto a lehr mat and the pusher mechanism is guided such that it does travel in the direction of the moving cross-conveyor during its pushing movement. Because of the speed with which the mechanism has been operated in order to keep up with the production of the ware, the stability of the containers became a problem, since it was necessary to push the ware at a fairly rapid pace; otherwise, the pusher bar would tip the leading container at what may be termed the "cut-off point".

The above-referred-to Mumford patent adds to the general operation of lehr loader, stabilizing bars which, in effect, are intended to maintain the stability of the containers by confining the amount of movement of the neck of the container relative to its base so that the mechanism could be operated at a faster rate than in the past without tipping the unstable containers during transfer to the lehr mat.

Another example of a lehr loader is that of Smith et al., U.S. Pat. No. 2,547,791 issued Apr. 3, 1951. In this patent the loader bar is designed to move straight forward without any side motion. This type of loader was successful where the rate of production was not too fast and the speed of the bar at impact with the line of ware was not too severe. In comparison to the operation of mechanisms that are used to load lehrs at the present time, this Smith et al. patent discloses an apparatus which was effective in its day by loading ware on a lehr where the glassware was being produced at perhaps less than half the production speeds that are now being met.

It can be seen from the foregoing that it is increasingly a problem to operate the lehr loader or its pusher bar so that it may pass through the row of bottles on a cross-conveyor without tipping the ware and without interfering with the movement of the next line of ware coming on the cross-conveyor. It is to this problem that the present invention is directed and the method set forth hereinafter will provide a system of coordinate movement of the machine section sweepout mechanisms, the machine conveyor, ware transfer apparatus and cross-conveyor with the lehr loader so as to provide an improved method for loading containers into a annealing lehr.

SUMMARY OF THE INVENTION

Method of loading containers into a annealing lehr wherein a plural section bottle-forming machine supplies ware to a machine conveyor and the ware moves from the machine conveyor by way of a ware transfer to a cross-conveyor from which the ware is pushed onto the lehr in which the improved method comprises changing the normal interval between sweepout operations in relation to the speed of the machine conveyor and increasing the speed of the ware transfer and maintaining normal speed at the cross-conveyor such that groupings of ware on the cross-conveyor will be serially arranged in relation to the cycle of the forming machine and separated by a predetermined gap.

BRIEF DESCRIPTION OF THE DRAWING

The drawing is a schematic plan view of a typical glassware forming system illustrating how the newly formed ware is moved from the forming machine to a lehr.

The following description is given of the single FIGURE, which constitutes the drawing in this application, it being understood that the various mechanisms which are schematically illustrated are old and well-known in the art.

An 8-section, double gob, glass forming machine generally designated 10 is schematically shown as a series of rectangular boxes 11 which represent individual sections of the glass forming machine. Each of the boxes 11 will have a sweepout mechanism 12 associated therewith. The sweepout mechanisms 12 are of conventional design and may be similar to those shown, for example, in U.S. Pat. No. 3,812,690 issued May 28, 1974 to A. W. Faure. Each sweepout mechanism 12 is associated with a machine section dead plate 13. The dead plate, while being attached or mounted to the side of a machine conveyor 14, generally are thought of as being part of the forming machine section. The dead plate serves as a cooling site for the ware after it has been taken from the blow molds. The ware is placed upon the dead plate preparatory to being swept off onto the surface of the machine conveyor which will be moving to the right, as viewed in the drawing. Each of the eight sweepout mechanisms will be mechanically operated through 90°, or slightly more, by an individual cam carried by a common shaft which extends the full length of the machine 10. Such a shaft is shown in FIG. 2 of U.S. Pat. No. 3,812,690 at 10, with the referred-to cams being designated 12 and 112. The machine conveyor 14 will carry the ware away from the forming machine to a cross-conveyor 15 which may be positioned, for example, at right angles with respect to the machine conveyor. At this point of juncture of the two conveyors, a ware-transfer device 16 is provided for transferring the ware from the machine conveyor to the cross-conveyor while maintaining the same spacing of the ware.

The cross-conveyor may be similar to that shown in the above-referred-to Mumford U.S. Pat. No. 4,067,434 at 13 or in the above-referred-to Smith et al U.S. Pat. No. 2,547,791 at 31. In both patents the cross-conveyors are positioned to travel across the width of a lehr belt or mat and in front of a pusher mechanism or lehr loader, as they are termed, whose function is to push the ware from the cross-conveyor onto the lehr mat.

In most cases, as is illustrated by the Mumford and Smith et al patents, there is a dead plate or transfer plate between the cross-conveyor and the lehr mat surface and it is across this dead plate that the pusher mechanism must slide the ware.

As previously stated, it is necessary to move the ware around the corner by a transfer device 16. Such a device may take the form shown in U.S. Pat. No. 2,912,093 issued Nov. 10, 1959 to A. G. Lauck. While the patent illustrates the handling of two incoming lines moving out in a single line, obviously it could operate as a single incoming and a single outgoing transfer apparatus. Other transfer devices, known in the art, use a series of paddles carried at spaced intervals on an endless chain.

As previously mentioned, one of the major problems now confronting manufacturers of glass containers is the inability to smoothly move the ware from the cross-conveyor onto the lehr mat by a pusher mechanism that will not interfere with the leading article on the cross-conveyor which will form the next row in the lehr.

As previously stated, with increased production, speeds of the cross-conveyors and of the machine conveyor have necessarily increased. In the present invention there is illustrated a lehr 17 having a moving lehr mat 18. A pusher bar 19 operated by a lehr loader mechanism 20 is positioned in alignment with the lehr mat and, as illustrated, is co-extensive with the width of the lehr mat. When using a push bar loader to transfer bottles from the cross-conveyor to the lehr mat, the loader bar 19 must pass through the row of bottles with enough speed to clear the oncoming bottles on the cross-conveyor and provide a clean "cut-off". Some years ago, a side shift mechanism was developed which caused the push bar to move with the flow of bottles on the cross-conveyor during the push in stroke. This proved to be an adequate solution to the problem at production speeds which were then in use. Since that time speeds have nearly doubled and shifting the bar at these speeds has become impractical.

The present invention overcomes this clearance or "cut-off" problem by putting the bottles in groups on the cross-conveyor such that there is a gap between the bottles on the cross-conveyor which will provide for the push bar clearance. This gap is produced by proper selection of the machine conveyor speed and the setting of the sweepout cams. As a specific example, an IS-8 section, double gob machine produces sixteen bottles in one machine cycle. It is normal to have a conveyor speed which results in evenly spaced bottles with the sweepout cams set so that a pair of bottles is swept out for each 45° of cam rotation. If the cams are set a few degrees less than 45°, the bottles will be equally spaced in groups of eight, then a gap, then another group of eight, a gap, etc. By proper selection of the cam setting angles, the effect on the machine conveyor could be the same as having all bottles equally spaced, with one bottle missing, then a group of eight, one missing, a group of eight, etc. At the point where the bottles transfer from the machine conveyor to the lehr conveyor, the transfer device 16 is geared to operate at a speed which will be 17 paddles or 17 transfer fingers per machine cycle instead of 16 as is presently normal. One paddle will be empty for each gap in the line of bottles on the machine conveyor, thereby leaving a gap in the row of bottles on the cross-conveyor which will be the space for cut-off clearance.

In those situations where a single bottle is being produced by each section of the plural section forming machine, almost any number of bottles may constitute a group that may be separated by a gap. Obviously, however, a single grouping cannot exceed the number of sections producing ware, since the repetition of the groups and the position of the gap will be the same for each full machine cycle. You may still have a gap in the middle of a machine cycle and still have the production from the end of one cycle and the beginning of the next cycle actually comprise the group which is separated by the gap.

The selection of how many bottles you may have in a group is dependent, usually, upon the number of rows of bottles that it is desirable to have in the lehr. The diameter of the ware and lehr width are prime considerations as well as are the required spacing between bottles.

When plural bottles are formed on a single section, termed "plural cavity", of a multiple section machine, the same general considerations as to where the gap between groups may be are given for arranging the most desirable pattern. On additional fact, however, is that the bottle gap or gaps may occur only between groups which are a multiple of the number of cavities on the single section. For example, a 10-section, double gob machine could have a gap after each group of ten bottles or after the full machine cycle of twenty bottles. An 8-section, double gob machine could have groups of four, eight or sixteen bottles separated by gaps. A triple gob, 10-section machine could have a gap after fifteen or thirty bottles, but not ten, because they are produced three at a time.

It can be seen from the foregoing, since commercial lehrs for glass container annealing range in widths of from five feet to twelve feet, that selection of the group or groups that will be moved onto and constitute a row on the lehr can be varied. The row will normally be completely assembled on the cross-conveyor and then pushed onto the lehr. Centering of the row in the lehr may be accomplished by adjusting the timing of the pusher so that the cut-off or gap in the row of ware on the cross-conveyor is advantageously positioned relative to the lehr width.

Furthermore, it may be that the best arrangement might result in one or more gaps being provided in a single row of ware in the lehr. The prime concern of the present invention is to provide a "cut-off" gap, in the row that spans the lehr width, at the point where the trailing end of the row is pushed onto the lehr by the loader.

This grouping system can be further modified to arrange bottles in groups of four, a space, group of four, etc. Other groupings are also available by proper cam settings and machine conveyor speeds. This makes it possible to utilize the full width of the lehr, satisfying various lehr widths and bottle diameters. While the presently illustrated method is for an 8-section, double gob forming machine, it should be obvious that the invention may be used for single gob or triple gob and for other numbers of sections, such as 10-section machines.

In the method set forth above, the machine conveyor may be operated at essentially its normal speed. Obviously, by having a gap in the line of ware at the interval of machine cycle time, the space that is occupied by the gap has to be made up in the spacing of the ware so that the actual bottle to bottle spacing will have to be less.

If it is more desirable or even necessary to maintain the bottle to bottle spacing that was previously considered essential to good bottle handling, then the machine conveyor speed could be increased; however, it will still require some adjustment of the sweepout cams to assure smooth handling and spacing of the ware with appropriate gaps to provide the desired "cut-off" by the pusher bar of the line of ware on the cross-conveyor. With an increased machine conveyor speed, obviously more footage of conveyors will pass the machine during a full machine cycle; however, the opportunity to use the increased speed as a means for providing a gap in the line of ware is present.

In view of the fact that there is a gap provided at the cut-off, it is possible by the utilization of this invention to move the push bar much slower as it passes through the row of bottles and this results in fewer down or tipped over bottles.

I claim:

1. In the method of handling newly formed ware, produced by an inline, plural section glassware forming machine, from the forming machine to the machine conveyor and then to the lehr, the improvement in placing the ware on the machine conveyor comprising the steps of:

placing a first grouping of ware produced from a plural section bottle forming machine on the moving machine conveyor at equally spaced intervals in a single line, placing successive groupings of ware on said conveyor with a gap of predetermined length between each grouping, and transferring the ware and the gap from the machine conveyor to a cross-conveyor in front of the lehr whereby loading of the lehr by pushing the group of ware from the cross-conveyor into the lehr may be accomplished on groupings of ware which are separated by a cut-off gap.

2. The method according to claim 1 wherein the step of placing successive groups of ware on the machine conveyor with a gap therebetween is carried out by increasing the speed of the machine conveyor relative to the time of operation of all of the sweepout operations for a complete machine cycle thereby providing a gap of predetermined length between successive groups of containers representing the output of a complete cycle of the forming machine.

3. The method of claim 1 wherein the gap produced is at a position which is a multiple of the number of containers produced in a section.

4. The method of claim 1 wherein the step of placing the groups of ware on the machine conveyor with a gap therebetween is carried out by more closely spacing the individual ware from the forming machine on the machine conveyor with the machine conveyor speed being maintained constant to thereby provide a complete machine cycle of ware in a group followed by a gap and successive groups similarly placed with intervening gaps so that groups of ware may be pushed as a group from the cross-conveyor into the lehr without interference with the next group.

* * * * *